(12) United States Patent
Inose et al.

(10) Patent No.: US 7,921,495 B2
(45) Date of Patent: Apr. 12, 2011

(54) CORNER JOINT STRUCTURE FOR BRIDGE PIER AND METHOD OF PRODUCING THE SAME

(75) Inventors: Koutarou Inose, Yokohama (JP); Hiroto Yamaoka, Yokohama (JP); Isao Kawaguchi, Yokohama (JP); Yasumasa Nakanishi, Hiratsuka (JP)

(73) Assignee: IHI Corporation, Tokyo (JP)

(*) Notice: Subject to any disclaimer, the term of this patent is extended or adjusted under 35 U.S.C. 154(b) by 134 days.

(21) Appl. No.: 12/374,973

(22) PCT Filed: Jul. 31, 2006

(86) PCT No.: PCT/JP2006/315152
§ 371 (c)(1),
(2), (4) Date: Jan. 23, 2009

(87) PCT Pub. No.: WO2008/015728
PCT Pub. Date: Feb. 7, 2008

(65) Prior Publication Data
US 2009/0255068 A1    Oct. 15, 2009

(51) Int. Cl.
*E01D 19/02* (2006.01)
*E01D 21/00* (2006.01)

(52) U.S. Cl. .................. 14/77.3; 14/75; 14/77.1

(58) Field of Classification Search ............. 14/75, 77.1, 14/77.3, 78
See application file for complete search history.

(56) References Cited

U.S. PATENT DOCUMENTS
6,818,857 B1 * 11/2004  Cho et al. ............... 219/121.64

FOREIGN PATENT DOCUMENTS

| JP | 55-139176 | 10/1980 |
| JP | 04-022590 | 1/1992 |
| JP | 06-114587 | 4/1994 |
| JP | 8-155661 | 6/1996 |
| JP | 2002-301582 | 10/2002 |
| JP | 2005-179957 | 7/2005 |
| JP | 2005-188041 | * 7/2005 |
| JP | 2006-224138 | 8/2006 |

OTHER PUBLICATIONS

Inose, Koutarou et al., "Estimation for corner joint strength of structural member that under the ultimate state", vol. 72, pp. 250-251 (published on Mar. 24, 2003).

* cited by examiner

*Primary Examiner* — Raymond W Addie
(74) *Attorney, Agent, or Firm* — Cohen Pontani Lieberman & Pavane LLP

(57) ABSTRACT

An end face (20) of one (10a) of two adjacent thick steel plates (10a, 10b) intended to construct a corner joint of a bridge column is formed into a beveled end face (22). Laser beam welding is applied to a root portion (24) of the beveled end face, and arc welding is applied to bevels (26, 28) thereof so that grooves defined by the bevels (26, 28) are filled with weld metal (40).

2 Claims, 4 Drawing Sheets

CORNER JOINT STRUCTURE FOR BRIDGE PIER AND METHOD OF PRODUCING THE SAME

RELATED APPLICATIONS

This is a U.S. National Phase Application under 35 USC §371 of International Application PCT/JP2006/315152 filed on Jul. 31, 2006.

TECHNICAL FIELD

This invention relates to a corner joint structure of a bridge column and corner joint construction method, more specifically a technique for constructing a steel bridge column by welding ends of thick plates of steel to form corner joints.

BACKGROUND ART

In making bridge columns supporting bridges, elevated roads, etc., various materials including concrete are conceivable. Bridge columns made of steel are an example.

Generally, steel bridge columns are constructed by welding ends of thick plates of steel to form corner joints, thereby constructing a structure with a closed rectangular (square, for example) cross-section.

In welding the ends of thick steel plates to form corner joints, arc welding (SAW, SMAW, GMAW, etc.) is frequently used for reasons including ease of welding.

In forming a corner joint by arc welding, it is common to form a bevel at an end of one of the two thick steel plates to be joined, and form an accumulation of weld metal in a groove defined by the bevel. When such bevel is formed, arc welding cannot be applied to a root portion, so that a non-welded portion (unmelted portion) remains, so that the corner joint is formed as a partly-welded joint. Also when the corner joint is formed as such partly-welded joint, the corner joint needs to have sufficient rigidity and strength. Research shows that limiting the size of the root portion measured along the plate thickness to, for example ¼th the thickness of the thick steel plate or below, thereby ensuring a sufficiently large bevel leads to a desired result (see "Estimation for corner joint strength of structural member that under the ultimate state" in "Preprints of the National Meeting of Japan Welding Society" vol. 72, pp. 250-251 (published on Mar.24, 2003)).

Recently, laser beam welding (LBW), which welds metal members by heating and melting them using a laser beam, has been developed and is being put to practical use. For example, there is publicly known a welding method in which arc welding and laser beam welding are applied to metal members with a single-V groove defined between them (see Japanese Patent Application KOKAI Publication Hei 6-114587).

As disclosed in "Preprints of the National Meeting of Japan Welding Society" vol. 72 mentioned above, in arc welding, limiting the size of the root portion measured along the plate thickness to ¼th the plate thickness or below, thereby ensuring a sufficiently large bevel, particularly with the intention of forming a corner joint as a completely-welded joint, leads to sufficient rigidity and strength of the corner joint, on the one hand, but on the other hand, leads to an increase in welding work, high costs, and an increase in weld metal corresponding to an increase in size of a groove defined by the bevel. The increased amount of weld metal leads to an increase in thermal shrinkage and therefore an increase in residual stress, and invites an increase in thermal deformation due to excessive heat input.

Further, the corner joint formed as a partly-welded joint including an unmelted portion cannot have sufficient quake resistance, even though it can support a normal load.

In the welding method disclosed in Japanese Patent Application KOKAI Publication Hei 6-114587 mentioned above, laser beam welding and arc welding are applied to plates to form a butt joint. Specifically, in the welding method disclosed in this publication, laser beam welding is applied to a root portion of a single-V groove, from the root-portion side (back side) of the plates, and arc welding is applied to bevels thereof, from the bevel side (front side) of the plates.

The corner joint of the steel bridge column distinct from a simple butt joint, however, does not allow direct application of the welding method disclosed in the above-mentioned publication.

Further, the technique disclosed in the above publication aims chiefly to improve shape accuracy, and does not solve the problems as mentioned above.

DISCLOSURE OF THE INVENTION

The present invention has been made to solve the problems as mentioned above. The primary object of the present invention is to provide a corner joint structure of a bridge column and corner joint construction method which can curb residual stress, thermal deformation and the like, reduce the amount of welding work and the amount of welding material, and at the same time ensure high quake resistance.

In order to achieve the above object, the present invention provides a corner joint structure of a bridge column, constructed by welding an end face of one of two adjacent thick steel plates to a side surface of the other thick steel plate at a lateral end thereof, wherein said end face of the thick steel plate is a beveled end face, a root portion of said beveled end face is welded by laser beam welding, and a bevel thereof is welded by arc welding so that a groove defined by the bevel is filled with weld metal.

An attempt to form a corner joint of a bridge column as a completely-welded joint by applying only arc welding to thick steel plates entails an increase in the amount of weld metal corresponding to an increased size of a groove defined by the bevel. The increase in the amount of weld metal leads to great residual stress in the thick steel plates due to thermal shrinkage of weld metal, and invites thermal deformation of the thick steel plates due to increased heat input. Applying laser beam welding to the root portion of the beveled end face, however, can minimize the amount of weld metal, thereby curbing residual stress and thermal deformation of the thick steel plates. Thus, a corner joint of a bridge column can be easily formed as a completely-welded joint by welding thick steel plates, without an increase in size of the bevel of the beveled end face and without an increase in heat input. This means that a corner joint with sufficient rigidity and strength, and therefore a bridge column with high quake resistance can be constructed by a reduced amount of welding work and with a reduced amount of welding material.

In this case, the beveled end face is desirably a double-beveled end face.

The double-beveled end face offers a merit such that, for example when the thick steel plate is great in thickness, a pair of bevels are provided in place of a single bevel, so that each bevel is allowed to have a minimized size. This leads to reducing the residual stress and thermal deformation of the thick steel plates caused by arc welding, to a sufficiently low level.

A single-beveled end face providing a half-V or J groove open to the outside of the bridge column is also desirable.

The single-beveled end face offers a merit, for example when the thick steel plate is relatively small in thickness, such that the welding work is carried out only from the outside of the bridge column, while curbing the residual stress and deformation of the thick steel plates caused by arc welding. In other word, it leads to a further reduction in welding work, It is desirable that the size of the root portion measured along the thickness of the thick steel plate be greater than ¼th the thickness of the thick steel plate.

As mentioned above, in forming a corner joint by arc welding, limiting the size of the root portion measured along the plate thickness to, for example ¼th the thickness of the thick steel plate or below leads to desired rigidity and strength of the corner joint. In other words, the size of the root portion measured along the plate thickness greater than, for example ¼th the thickness of the thick steel plate is highly likely to result in insufficient rigidity and strength of the corner joint. By applying laser beam welding to the root portion, however, the corner joint can be formed as a completely-welded joint with sufficient rigidity and strength, even when the size of the root portion measured along the plate thickness is greater than ¼th the thickness of the thick steel plate. In this case, reducing the area subjected to arc welding leads to reducing the residual stress and thermal deformation of the thick steel plates caused by arc welding to a sufficiently low level.

The present invention also provides a method of constructing a corner joint of a bridge column by welding an end face of one of two adjacent thick steel plates to a side surface of the other thick steel plate at a lateral end thereof, comprising: a first step of forming said end face of the thick steel plate into a beveled end face, a second step of applying laser beam welding to a root portion of the beveled end face, a third step of applying, after the second step, arc welding to a bevel of the beveled end face so that a groove defined by the bevel is filled with weld metal.

An attempt to weld thick steel plates only by arc welding to form a corner joint of a bridge column as a completely-welded joint requires that the bevel of the beveled end face have an increased size, which entails an increase in the amount of weld metal, which in turn leads to great residual stress in the thick steel plates due to thermal shrinkage of weld metal, and invites thermal deformation of the thick steel plates due to increased heat input. In contrast, the method in which an end face of one of two adjacent thick steel plates is formed into a beveled end face (first step), then laser beam welding is applied to a root portion of the beveled end face (second step), and then arc welding is applied to a bevel thereof so that a groove defined by the bevel is filled with weld metal can minimize the amount of weld metal, thereby curbing the residual stress and thermal deformation of the thick steel plates. Consequently, a corner joint of a bridge column can be easily formed as a completely-welded joint by welding thick steel plates without an increase in size of the bevel of the beveled end face and without an increase in heat input. This means that a bridge column with high quake resistance can be constructed by a reduced amount of welding work and with a reduced amount of welding material.

BEST MODE OF CARRYING OUT THE INVENTION

Figure 1:
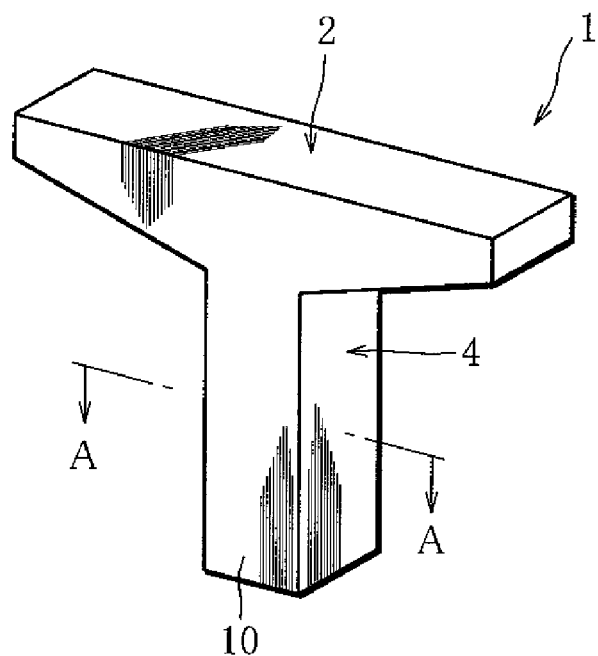
FIG. 1 is a diagram showing a steel bridge column to which a corner joint structure according to the present invention is applied.

Referring to the drawings attached, an embodiment of the present invention will be described.

Figure 2:
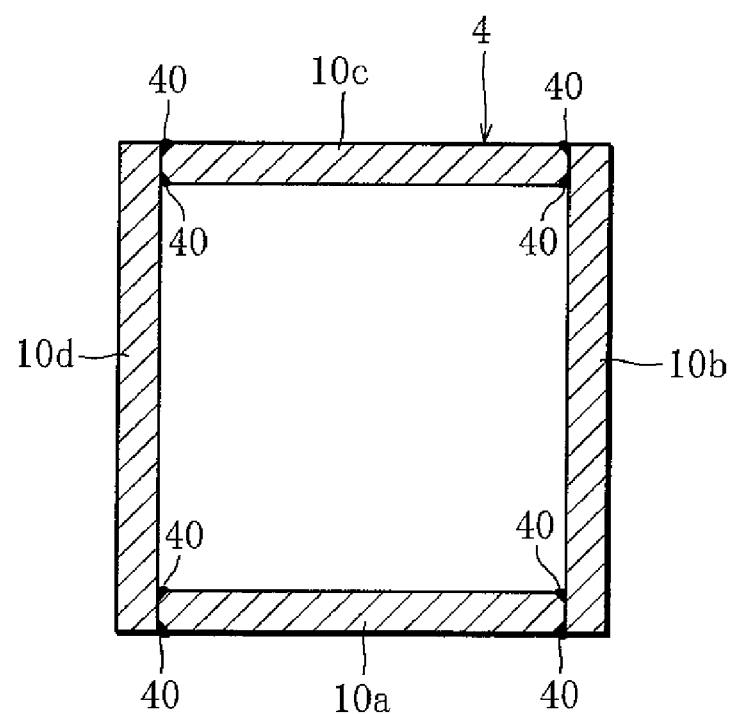
FIG. 2 is a cross-sectional view of the bridge column along line A-A in FIG. 1.

FIG. 1 shows a steel bridge column to which a corner joint structure according to the present invention is applied, and FIG. 2 shows a cross-sectional view of the bridge column along line A-A in FIG. 1. The following description is based on these Figures.

As shown in FIG. 1, a steel bridge column 1, which is a bridge column supporting, for example an elevated road or the like, includes an arm portion 2 and a leg portion 4 constituting a T-shape, and is a structure with a closed cross-section constructed by welding ends of a plurality of thick steel plates 10 to each other.

Each thick steel plate 10 is, for example a flat plate with a specified uniform thickness t1(between 25 mm and 60 mm, for example).

As shown in FIG. 2, for the leg portion 4, the lateral ends of the adjacent thick steel plates 10a to 10c are welded to each other, over the entire length of a corner joint, by laser beam welding and arc welding, where an accumulation 40 of weld metal is formed. As a result, a structure with a closed rectangular cross-section is formed as a leg portion 4.

Figure 3:
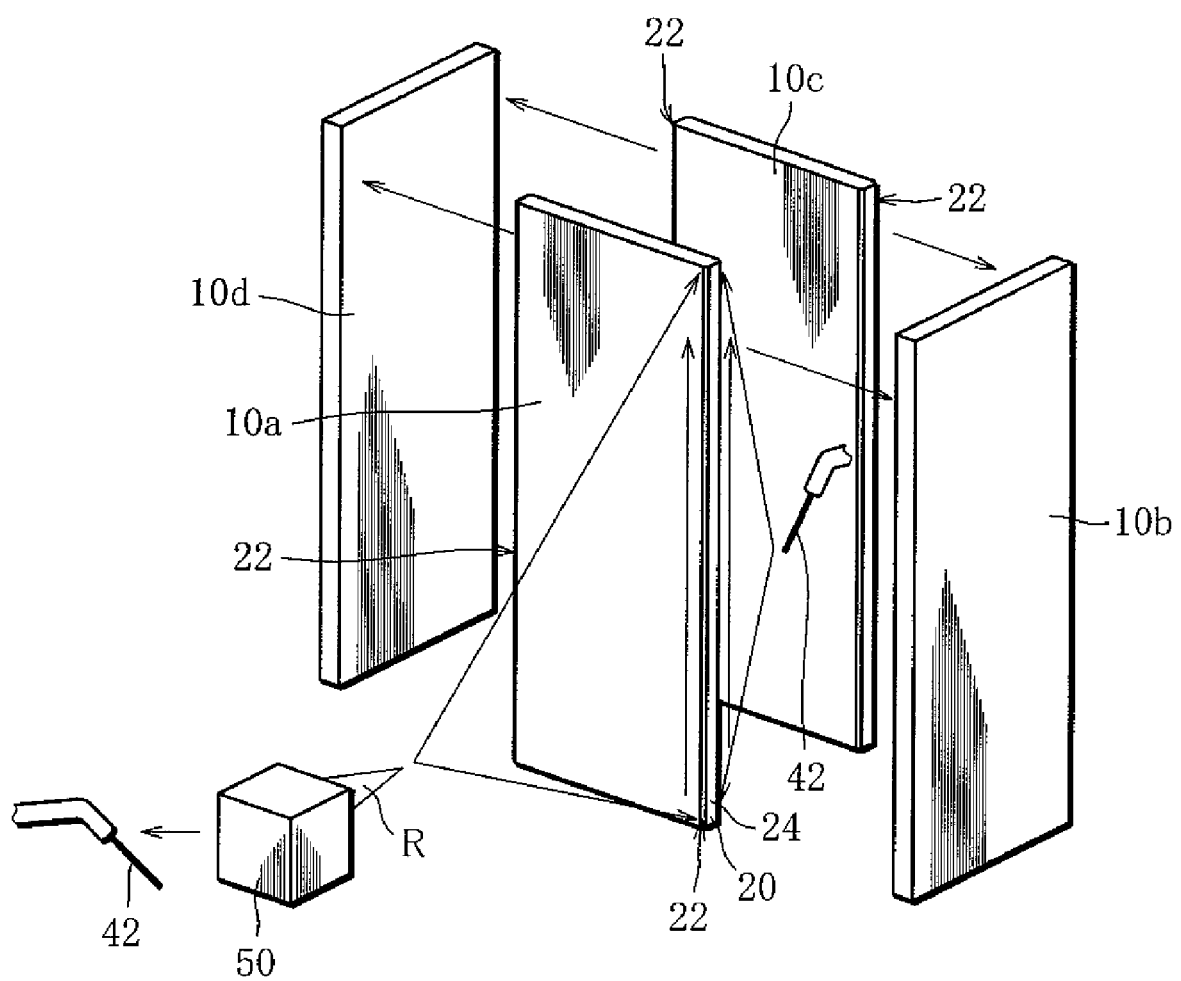
FIG. 3 is a diagram illustrating a process of constructing the bridge column.

FIG. 3 illustrates a process of constructing a bridge column 1 by welding the thick steel plates 10 to each other. Next, referring to this Figure, a method of constructing a corner joint of a bridge column will be explained in detail. Here, the explanation will be given taking up the joining of thick steel plates 10a and 10b as a representative example.

First, in preparation for arc welding, each end face 20 of the thick steel plate 10a is formed into a double-beveled end face 22 (first step).

Figure 4:
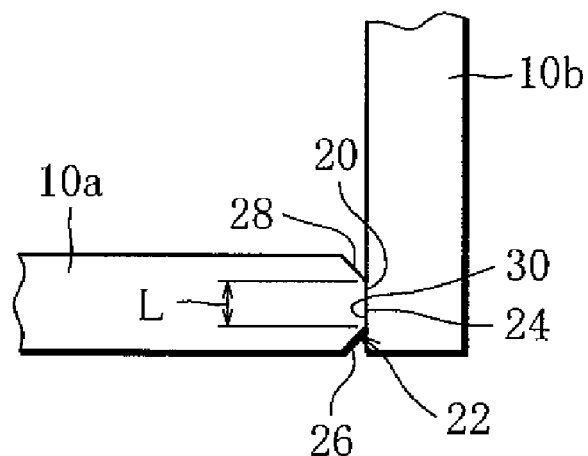
FIG. 4 is a diagram showing a double-beveled end face, on an enlarged scale.

As shown in FIG. 4 on an enlarged scale, the double-beveled end face 22 is formed by chamfering the opposite longitudinal edges of the end face 20 to leave the intermediate part as a root portion 24.

Specifically, considering that the root portion 24 is subjected to laser beam welding as described later, the size L of the root portion 24 measured along the plate thickness is set to, for example a maximum size that allows laser beam welding to be performed on the root portion in the direction of plate thickness, or in other words, a size commensurate with the capacity of laser beam welding.

As already mentioned, it is known that in forming a corner joint by applying only arc welding, limiting the size L of the root portion 24, which results in a non-welded portion, measured along the plate thickness, to, for example ¼th the thickness t1of the thick steel plate 10 (t ¼) or below leads to a desired result. In other words, it is known that the size L of the root portion 24 resulting in a non-welded portion, for example greater than ¼th the thickness t1of the thick steel plate 10 (t ¼), measured along the plate thickness is highly likely to result in insufficient rigidity and strength of the corner joint formed.

When laser beam welding is applied to the root portion 24 as in the present invention, however, there is no reason to limit the size L to ¼th the plate thickness t1 or below. Instead, the size L may be greater than ¼th the plate thickness t1 as long as it is within the capacity of laser beam welding.

Thus, more specifically, the size L of the root portion 24 measured along the plate thickness is set to be greater than ¼th the thickness t1 of the thick steel plate 10 within the capacity of laser beam welding, for example.

Then, the root portion 24 of the thick steel plate 10a is butted against a side surface of the thick steel plate 10b at a lateral end 30, and first, laser beam welding is applied to the root portion 24. Specifically, with the root portion 24 butted against the side surface of the thick steel plate 10b at the lateral end 30, a laser beam R of, for example a YAG laser, a $CO_2$ laser or the like is applied by a laser welding machine 50, from the outer side, or bevel 26 side of the bridge column 1 toward the root portion 24. Consequently, the root portion 24 is welded to the side surface of the thick steel plate 10b at the lateral end 30.

After the root portion 24 of the thick steel plate 10a is welded to the side surface of the thick steel plate 10b at the lateral end 30, a filler metal rod 42 is inserted in each of the grooves defined by the bevels 26, 28 of the double-beveled end face 22, and arc welding is carried out with several passes or so, in which filler metal melted by an arc melts the portion of each thick steel plate 10a, 10b around it (third step).

Figure 5:
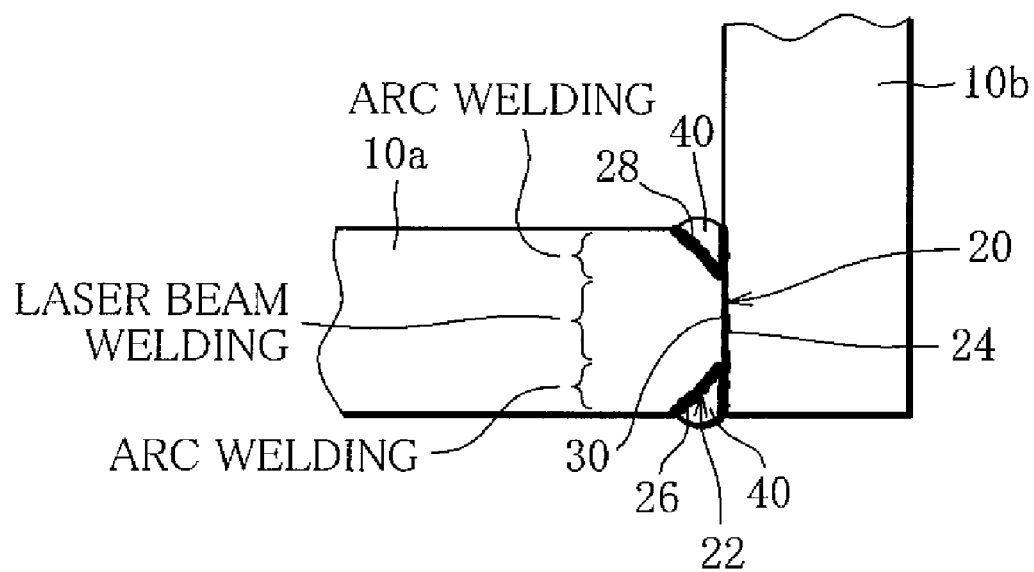
FIG. 5 is a diagram showing a weld region on an enlarged scale.

Consequently, as shown in FIG. 5 on an enlarged scale, the root portion 24 of the double-beveled end face 22 is welded to the thick steel plate 10b by laser beam welding, while the bevels 26, 28 are welded to the thick steel plate 10b by arc welding so that an accumulation 40 of weld metal fills the respective grooves defined by the bevels 26, 28.

Next, the function and advantage of the corner joint structure of a bridge column and corner joint construction method according to the present invention, configured as described above, will be explained. Also here, the explanation will be given taking up the joining of the thick steel plates 10a and 10b as a representative example.

Let us suppose that it is intended to form a corner joint of a bridge column 1 as a completely-welded joint only by arc welding. In this case, the bevels 26, 28 require an increased size and an arc requires intensity increased enough to weld also the root portion 24. This results in an increased amount of weld metal, which in turn leads to great residual stress in the thick steel plates 10a, 10b due to thermal shrinkage of weld metal, and invites thermal deformation of the thick steel plates 10a, 10b due to an increased amount of heat input.

In contrast, when the root portion 24 of the thick steel plate 10a is welded to the thick steel plate 10b by laser beam welding as described above, the bevels 26, 28 do not require an increase in size. Instead, the size of the root portion 24 measured along the plate thickness is set to be greater than ¼th the thickness t1 of the thick steel plate 10, for example to a size commensurate with the capacity of laser beam welding. This allows maximizing the size of the root portion 24 measured along the plate thickness and reducing the area to be subjected to arc welding, or in other words, reducing the size of the bevels 26, 28. This in turn allows reducing the welding work to several passes or so, minimizing the amount of weld metal, thereby reducing the thermal shrinkage of weld metal, thereby curbing residual stress in the thick steel plates 10a, 10b. Further, arc welding needs to cover only the bevels 26, 28 and does not need to cover the root portion 24. Thus, arc welding can be carried out without greatly increasing the intensity of the arc, which leads to reduction in heat input and therefore curbs thermal deformation of the thick steel plates 10a, 10b.

In other words, welding the root portion 24 of the thick steel plate 10a to the thick steel plate 10b by laser beam welding and then welding the bevels 26, 28 by arc welding enables easy construction of a corner joint as a completely-welded joint with sufficient rigidity and strength, without increasing the size of the bevels 26, 28 and without increasing heat input.

This means that a bridge column with high quake resistance can be constructed by a reduced amount of welding work, with a reduced amount of welding material, at reduced costs. Forming the end face 20 of the thick steel plate 10a into a double-beveled end face 22 offers a merit such that, for example when the thick steel plate 10a is great in thickness, a pair of bevels 26, 28 are provided in place of a single bevel, so that each bevel 26, 28 is allowed to have a minimized size. This leads to reducing the residual stress in the thick steel plates 10a, 10b and thermal deformation of the thick steel plates 10a, 10b caused by arc welding, to a sufficiently low level.

Figure 6:
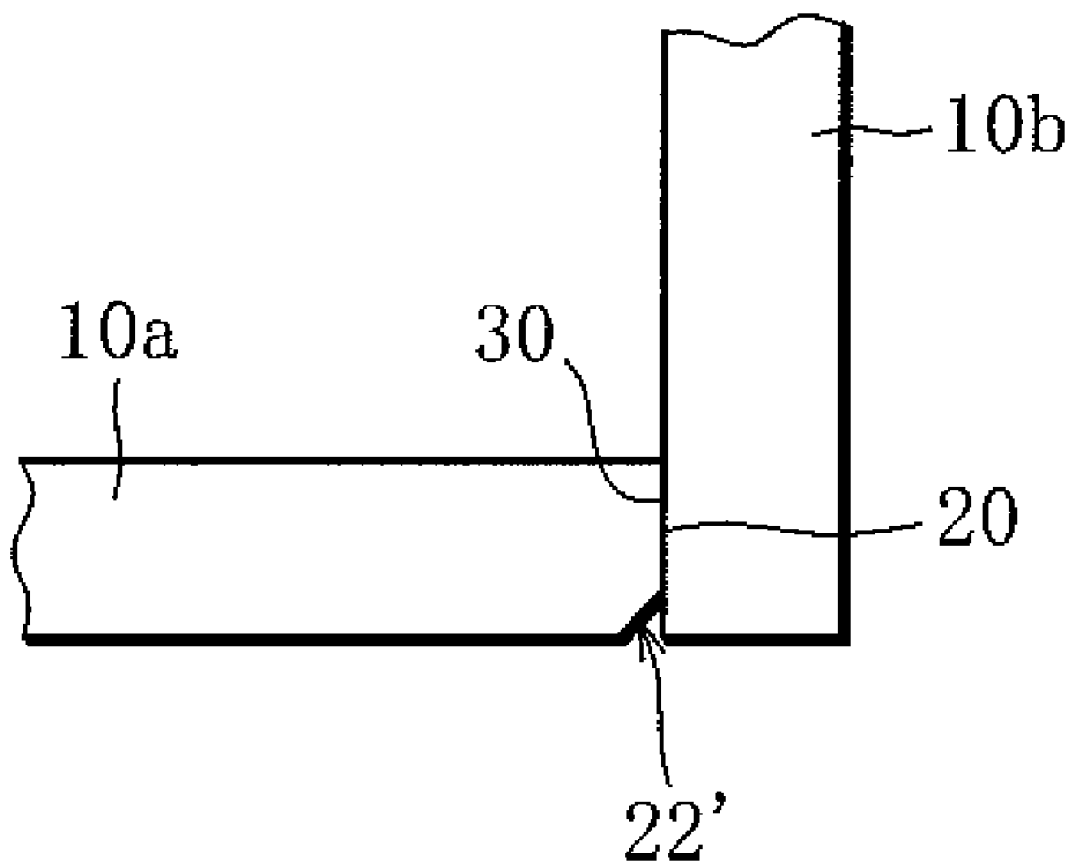
FIG. 6 is a diagram showing a single-beveled end face, on an enlarged scale.

Although, in the above-described embodiment, the end face 20 of the thick steel plate 10a is formed into a double-beveled end face 22, the end face 20 may be formed into a single-beveled end face 22' providing a half-V groove (or a J groove) open to the outside of the bridge column 1 as shown in FIG. 6 on an enlarged scale, for example when the thick steel plate 10a is relatively small in thickness.

When such single-beveled end face 22' providing a half-V groove open to the outside of the bridge column 1 is allowed, welding work is carried out only from the outer side of the bridge column 1, while curbing the residual stress in the thick steel plates 10a, 10b and thermal deformation of the thick steel plates 10a, 10b caused by arc welding. This leads to a further reduction in welding work.

In the above, an embodiment of the present invention has been described. The present invention is, however, not limited to the described embodiment, but can be modified in various ways without departing from the sprit and scope of the present invention.

For example, although in the described embodiment, the corner joint structure of a bridge column according to the present invention is applied to a corner joint of a leg portion 4, the present invention is of course applicable to a corner joint of an arm portion 2, etc.

The invention claimed is:

1. A corner joint structure of a bridge column, constructed by welding an end face of one of two adjacent thick steel plates to a side surface of the other thick steel plate at a lateral end thereof, wherein said end face of the thick steel plate is a double-beveled end face having bevels defining a pair of half-V or J grooves open to an outside and an inside of the corner joint structure of the bridge column, a root portion of said double-beveled end face is welded by laser beam welding, a size of a root portion measured along a thickness of the thick steel plate being greater than ¼ of the thickness of the thick steel plate, and said bevels of said double-beveled end face are welded by arc welding so that the pair of half-V or J grooves defined by said bevels are filled with weld metal.

2. A method of constructing a corner joint of a bridge column by welding an end face of one of two adjacent thick steel plates to a side surface of the other thick steel plate at a lateral end thereof, comprising:

a first step of forming said end face of the thick steel plate into a double-beveled end face having bevels defining a pair of half-V or J grooves open to an outside and an inside of the corner joint structure of the bridge, column, a second step of applying laser beam welding to a root portion of said double-beveled end face, a size of the root portion measured along a thickness of the thick steel plate being greater than ¼ of the thickness of the thick steel plate, and a third step of applying, after the second step, arc welding to said bevels of said double-beveled end face so that said pair of half-V or J grooves defined by the bevels is filled with weld metal.

* * * * *